Nov. 12, 1957  C. A. VOSSBERG  2,812,685
MEANS FOR DIMENSIONAL MEASUREMENT OF MOVING OBJECTS
Filed Dec. 8, 1953  3 Sheets-Sheet 3
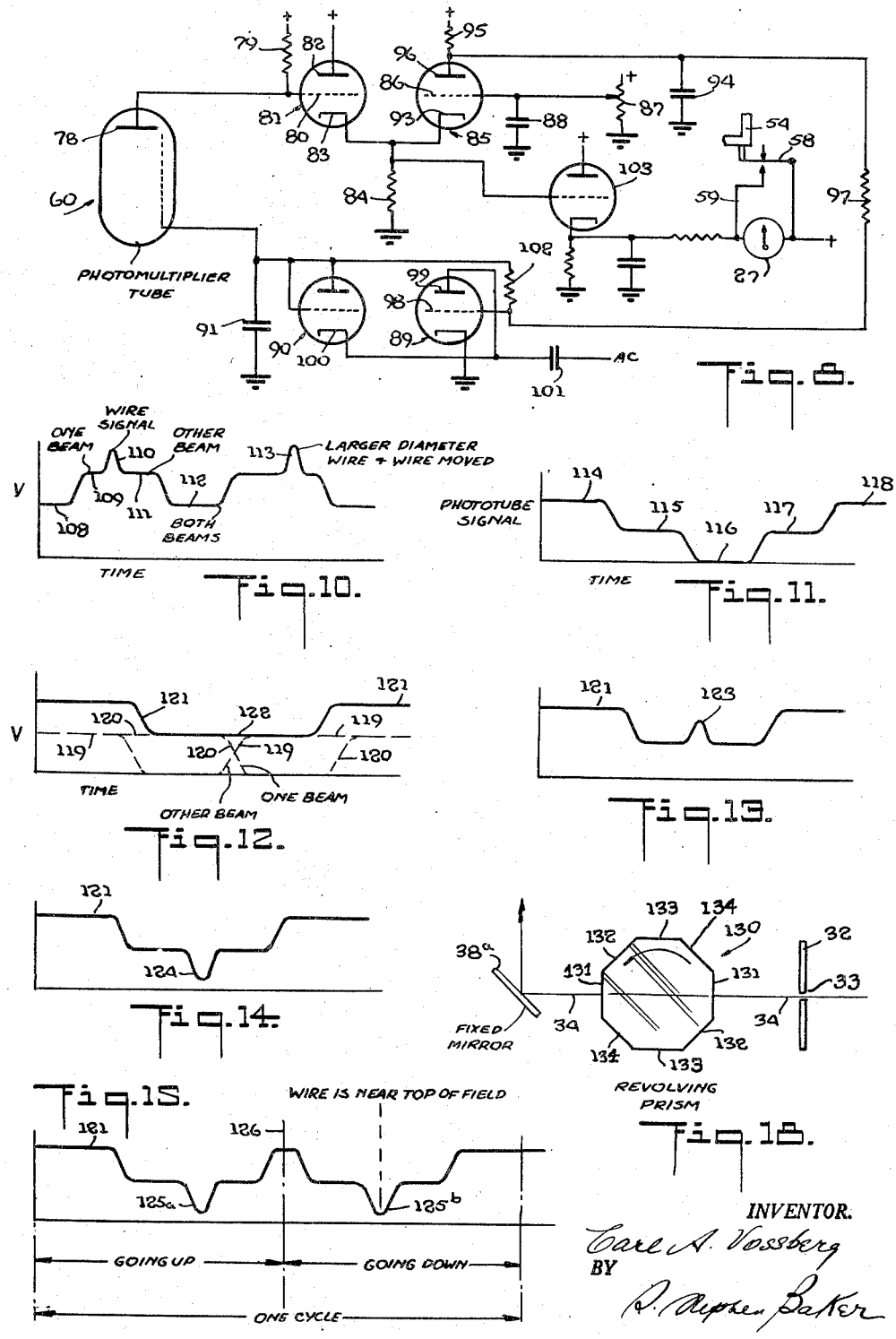
INVENTOR.
Carl A. Vossberg
BY
ATTORNEY

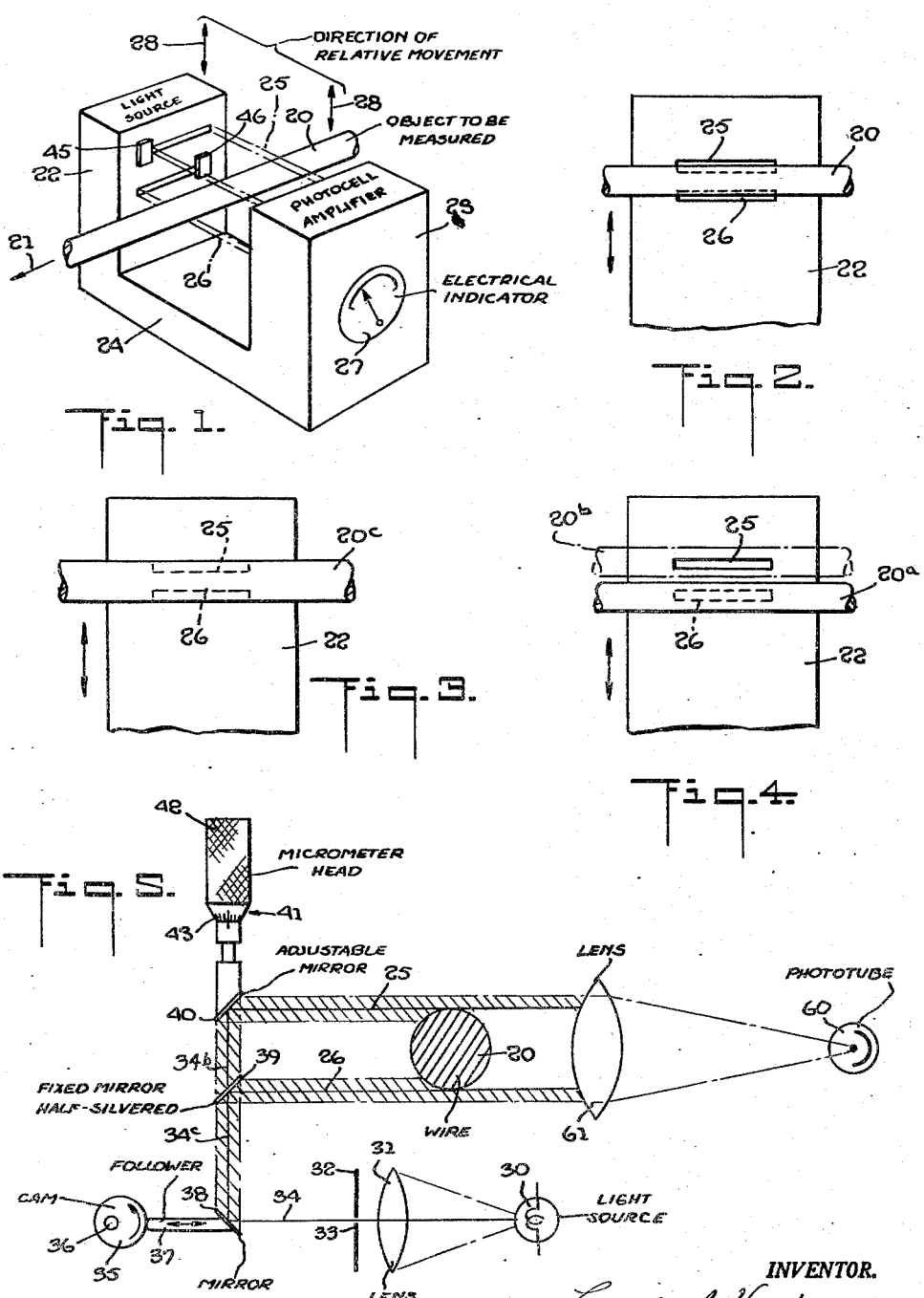

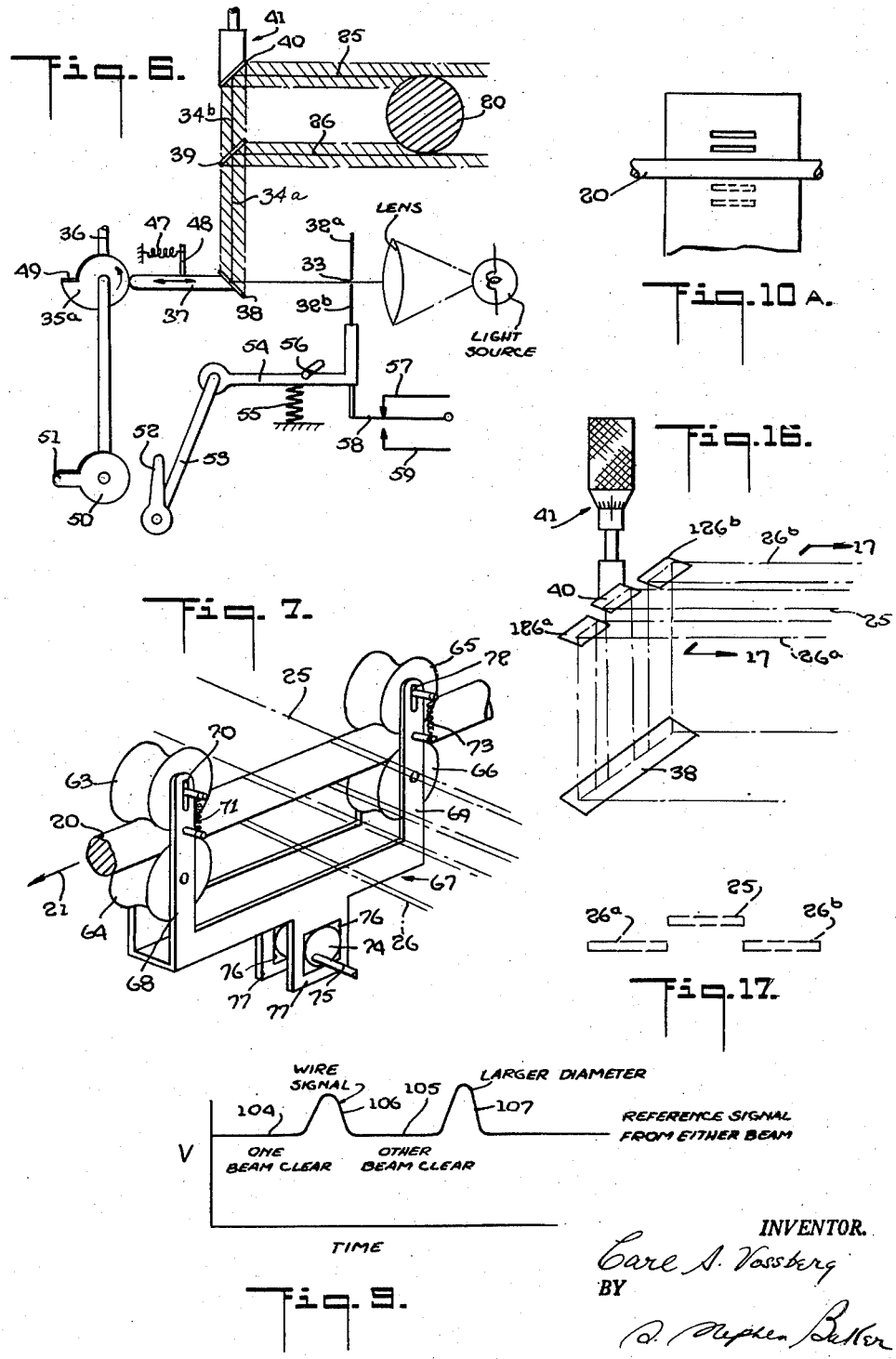

United States Patent Office

2,812,685
Patented Nov. 12, 1957

2,812,685

MEANS FOR DIMENSIONAL MEASUREMENT OF MOVING OBJECTS

Carl A. Vossberg, Umatilla, Fla.

Application December 8, 1953, Serial No. 396,989

19 Claims. (Cl. 88—14)

The present invention relates to the continuous measurement by radiant energy means of an outside or interboundary dimension of an object which is at least partially opaque to said radiant energy and has particular application to the measurement of such a dimension where the object is constantly moving in an irregular or random manner along the direction of the dimension to be measured.

For example, in the continuous measurement of the diameter of a wire being produced in a wire mill, the wire is being fed at relatively high speed past the measuring station and has a tendency to whip around in a random manner. This renders the measurement of the diameter of the wire by photoelectric methods extremely difficult, and has a tendency to introduce inaccuracies if conventional methods are used.

If the wire passes by an aperture in such manner, its variations in diameter intercept a light beam and cause the aperture to be shadowed in varying degree. Even if the wire remains stationary during measurement, the transverse dimension of the aperture should not exceed the maximum permissible diameter of the wire since small variations in wire diameter will have little effect on the total amount of light passing through the aperture except when the transverse dimension of the aperture is very nearly equal to and only slightly greater than the maximum permissible diameter of the wire.

If the wire is moving and it whips around as it passes the measuring aperture, then the maximum excursion during its whipping movement must be added to the maximum permissible diameter of the wire in determining the transverse dimension of the aperture. This results in an increased transverse dimension for the aperture, thus reducing the amount of light variation which accompanies a small change in wire diameter and the sensitivity of the measuring device is reduced accordingly.

The present invention overcomes this difficulty by cyclically scanning the moving wire with two spaced light beams which simultaneously scan opposite edges of the wire. The wire is caused to simultaneously intercept both beams at least partially in one scanning excursion. Pursuant to the invention, the beams can be made exceedingly narrow and are caused to seek out the wire in whatever position it may be. As will be noted from the description to follow, the beams are caused to scan the wire by movement in the direction of the dimension to be measured. The extent of such movement is determined by the maximum extent of whipping or other transverse movement of the wire which is likely to be encountered.

In one embodiment of the invention, the indicated wire diameter is entirely independent of instantaneous scanning speed so that any effects caused by movement of the wire during scanning are effectively eliminated.

According to another embodiment of the invention the wire is repeatedly scanned at constant speed in the same direction, the effects of wire movement being cancelled out in the course of repeated scannings.

Various other objects and advantages of the invention will become apparent upon reading the following specification together with the accompanying drawing forming a part hereof.

Referring to the drawing:

Figure 1 is a diagrammatic perspective view of an embodiment of the invention;

Figure 2 is a diagrammatic view showing a wire or other object of nominal diameter intercepting two spaced light beams to substantially equal extents;

Figure 3 is similar to Figure 2, showing the momentary complete interception of both light beams by a wire of the maximum diameter which can be measured;

Figure 4 is similar to Figure 2, showing the momentary complete interception of a single light beam;

Figure 5 is a diagrammatic representation of means for scanning the wire with two adjustably spaced parallel light beams;

Figure 6 is a fragmentary view similar to Figure 5 showing means for scanning the wire at constant velocity;

Figure 7 is a fragmentary perspective view showing means for scanning the wire by moving the wire relative to the two light beams;

Figure 8 is a schematic circuit diagram showing means for obtaining an electrical indication of the wire diameter;

Figure 9 is a graph illustrating the wave shape of the output from Figure 8 when the wire diameter is such as to cause simultaneous interception of both light beams;

Figure 10 is a graph similar to Figure 9 showing the output signal when magnitude of the excursion of the two light beams during scanning exceeds the wire diameter so that there is an interval when neither light beam is intercepted;

Figure 10A shows a scanning travel in which both light beams move completely past the wire in each direction of travel;

Figure 11 is a graph similar to Figure 9 showing the total illumination during a half cycle of scanning when the wire diameter is sufficiently large to intercept both beams simultaneously for an appreciable interval;

Figure 12 is a graph similar to Figure 9 showing the total illumination during a half cycle of scanning when the wire diameter is equal to the center spacing between the two light beams;

Figure 13 is a graph similar to Figure 12 showing the total illumination during a half cycle of scanning when the wire diameter is slightly less than the center spacing of the two light beams;

Figure 14 is a graph similar to Figure 12 showing the total illumination during a half cycle of scanning when the wire diameter is slightly greater than the center spacing between the two light beams;

Figure 15 is a graph similar to Figure 14 showing the output signal during a complete scanning cycle;

Figure 16 is a perspective view illustrating an arrangement for obtaining close spacing between the centers of the two light beams for the measurement of wire of relatively small diameter;

Figure 17 is a sectional view taken along the line 17—17 of Fig. 16 showing the arrangement of the light beams; and Figure 18 is a diagrammatic view of a modified form of light beam shifter using a revolving prism.

Referring to Fig. 1, a wire or other object 20 is being continuously fed from a processing machine (not shown) in the direction of the arrow 21. In the course of this longitudinal feeding movement, the wire 20 will whip around to a certain extent in a random manner, this movement having both vertical and lateral components. In the course of its movement, the wire 20 passes between a light source 22 and a photoelectric device 23 mounted on a common base 24. The light source 22 is arranged to produce two narrow substantially parallel light beams of equal light intensitites shown by way of illustration by being of generally rectangular cross-sectional configuration which are widened in the direction of longitudinal travel of the wire 20 as indicated by the arrow 21. However, any suitable beam shape may be employed. The two light beams 25 and 26 are directed toward the photoelectric measuring device 23 which measures their combined intensitites and gives a visual indication thereof on an electrical indicator 27. Indicator 27 may also comprise means for controlling an audible or visual alarm signal or a rejection mechanism.

Means are provided, of which certain examples are hereinafter illustratively described, for cyclically producing repeated relative movement of a reciprocating or unidirectional character between the wire 20 and the two light beams 25 and 26 in the direction of the arrows 28 in such manner that successive and effectively complete individual interceptions of both of the light beams 25 and 26 will occur in the course of each complete movement.

Referring to Figures 2, 3 and 4, this relative movement causes the wire 20 to intercept the light beam 26 completely in the position shown at 20a in Figure 4 and to intercept the light beam 25 completely when in the position shown in dotted lines at 20b, the wire 20 passing through the position shown in Figure 2 where it partially intercepts both beams. When the wire 20 is of maximum measurable diameter, it passes momentarily through the position shown at 20c in Figure 3 where it just completely intercepts both beams.

Referring to Figure 5, there is shown an arrangement wherein the two light beams 25 and 26 are cyclically vertically reciprocated with an adjustably fixed spacing between their centers for scanning the wire 20. A light source 30 is focussed through a suitable optical system diagrammatically indicated as a lens 31 and an opaque member 32 having a slit 33 formed therein to produce a single thin beam of light 34. The cross-sectional configuration of the light beam 34 is similar to that of the beams 25 and 26 described above.

An eccentric cam 35 is driven by a revolving shaft 36 to which it is secured. A horizontally reciprocating cam follower member 37 engages cam 35 and its movement is controlled thereby. Mounted on the free end of cam follower member 37 is a mirror 38 which reflects the beam 34 vertically upwardly to produce the beam 34a. The lateral position of the reflected beam 34a varies in accordance with the position of mirror 38 carried by the horizontally reciprocating cam follower member 37 so that it traverses the region indicated by the shaded area in a cyclical reciprocating manner.

The vertical reflected beam 34a is directed to a fixed inclined partially or half-silvered mirror 39 disposed above the moving mirror 38, a portion of the beam 34a being reflected in a horizontal direction to from the lower beam 26. The lower horizontal beam 26 reciprocates vertically through the shaded area indicated on either side of the beam.

Another portion 34b of the reflected beam 34a continues vertically upwardly through the half-silvered mirror 39 and is reflected in a horizontal direction by the vertically adjustable inclined mirror 40 to form the upper beam 25. Beam 25 is thus parallel to the lower beam 26 and reciprocates vertically through the shaded area shown on either side of the beam.

Adjustable mirror 40 is supported by a micrometer head 41 of conventional construction and the vertical position of mirror 40 may be adjusted by turning the knurled drum 42, the position of mirror 40 being accurately ascertainable by reference to the usual calibrated scale 43. As shown in Figure 5, the position of the upper mirror 40 has been so adjusted that the spacing between the centers of the two vertically reciprocating horizontal beams 25 and 26 is equal to the nominal or average diameter of the wire 20. In such a case, as shown hereinafter, no output signal is obtained when the wire is of the correct nominal diameter. If the actual diameter should deviate from its nominal value, then an output signal is obtained in the form of a pip, the direction and magnitude of which are in accordance with the direction and magnitude of any such deviation.

The upper and lower beams are adjusted to provide equal effective light intensities. This may be accomplished as illustrated in Figure 1 by reducing the horizontal width of one of the beams with respect to the other as by the adjustment plates 45 and 46. Alternatively, separate photoelectric devices may be used and individually adjusted to give the correct output signal for each beam, the individual outputs of the two devices being cumulatively combined in conventional manner to operate the indicator 27. This permits compensation for possible variations in the light transmitting and reflecting properties of the half-silvered mirror 39 and other factors which may be encountered in practice.

Where it is desired to utilize a constant scanning speed to avoid variations in the time base of the output signal, the arrangement of Fig. 5 may be modified as shown in Fig. 6. The eccentric cam 35 has been replaced by quick return cam 35a which drives the cam follower member 37 to the right at constant velocity against the yielding action of a tension spring 47 connected to an upright arm 48 carried by the cam follower member 37. When the quick return portion 47 of cam 35a reaches the cam follower member 37, the cam follower member 37 is drawn rapidly to the left by tension spring 47.

To prevent scanning of the wire 20 during the quick return travel, an additional cam 50 is mounted on revolving shaft 36 and carries a projection 51 which engages a rotatable arm 52 during the quick return motion. Arm 52 is fixed to a rock shaft 53 to which a control arm 54 is secured. Control arm 54 is urged in a counterclockwise direction by a compression spring 55 to bear against a stop pin 56. The opaque member 33 is shown formed in two portions 32a and 32b with the slit 33 between them. One of the portions of the opaque member 33 is fixed and the other portion is movable, the movable portion being connected to the end of control arm 54 for movement therewith. In Fig. 6, the lower portion 32b is shown connected to control arm 54 so that slit 33 will be widened during the quick return movement. If the upper portion 32a is connected to the control arm 54, the slit 33 will be closed during the quick return motion. In addition a transfer contact group 57—58—59 is shown actuated by control arm 54 during the quick return motion. The contacts 57—58—59 and the change in the width of slit 33 are used either jointly or separately to suspend response of the measuring device during the quick return motion, as explained in greater detail below. The constant unidirectional scanning arrangement of Fig. 6 is desirable whenever the indicating apparatus described below is of such a character that it integrates the output signal to an appreciable extent. Where the indicating apparatus responds only to the peak intensity of the signal, a constant time base is not required and constant scanning speed is unnecessary.

In Figure 5, the two beams, except to the extent to which either or both of them may be intercepted by the wire 20, are focussed throughout their range of scanning movement by a suitable optical system on the light sensitive area of a photocell 60, the optical system being represented diagrammatically as a lens 61.

Referring to Figure 7, there is shown an arrangement wherein the wire 20 is moved with respect to the light beams 25 and 26. The wire 20 passes between longitudinally spaced pairs of circumferentially grooved guide rollers 63—64 and 65—66 mounted in a common supporting frame 67 having upright pairs of arms 68 and 69.

The upper roller 63 is supported between the pair of arms 68 in vertically elongated slots 70, being pressed downwardly against the upper surface of wire 20 by a pair of tension springs 71. The upper roller 65 is similarly arranged, being supported in elongated slots 72 formed in arms 69 and pressed downwardly by a pair of tension springs 73.

The entire assembly is vertically movable and is reciprocated by a pair of eccentric cams 74 mounted on a revolving shaft 75. The cams 74 rotate in aligned rectangular apertures 76 formed in the downwardly extending ears 77 of the supporting frame 67, the height of the rectangular apertures 76 being substantially equal to the diameter of cams 74 and their width being sufficiently greater than the cam diameter to accommodate the eccentricity of the cams 74. In this manner the scanning is effected by moving the wire 20 with respect to the light beams 25 and 26.

It should be noted that the narrow dimension of the two beams 25 and 26 in their direction of scanning movement may be conveniently made adjustable as by an adjustable calibrated shutter arranged to partially obscure slit 33. This will permit the narrow dimension of the beams to be made equal to the difference between the maximum and minimum permissible diameters of the wire as determined by the maximum permissible deviation from a predetermined nominal value for the wire diameter.

Referring to Figure 8, the photocell 60 is illustratively shown as a photomultiplier tube of conventional type which uses secondary emission to obtain increased sensitivity. The anode 78 of photomultiplier 60 is connected through a resistor 79 to a suitable source of anode potential designated +, the negative terminal of the source being grounded.

The anode 78 of photomultiplier tube 60 is directly connected to the grid 80 of a triode 81 which is connected as a cathode follower. The anode 82 of triode 81 is connected directly to the source of positive potential + and the cathode 83 is connected to ground through a coupling impedance shown as a resistor 84.

Triode 81 is cathode coupled by direct inter-cathode connection to a control triode 85 which is connected generally as a grounded grid stage. The grid 86 of control triode 85 is normally biased to cut-off by a reference potential derived from the anode supply by means of an adjustable potentiometer 87. A by-pass capacitor 88 is provided.

The control triode 85 forms a part of a self-calibrated arrangement comprising two further triodes 89 and 90 which are energized from a source of alternating potential designated "A. C." and which apply a controlled negative potential to a capacitor 91 connected in the cathode circuit of the photomultiplier tube 60. This self-calibration is made possible by the fact that except for a short interval when the wire is being scanned and the wire diameter deviates from its nominal or average diameter, the light falling on the photomultiplier tube 60 will remain constant since the beams 25 and 26 have equal light intensities and either one beam or the other is uninterrupted except for the short interval when both beams are each partially intercepted by the wire.

When the signal applied by the photomultiplier tube 60 through cathode follower 81 to control triode 85 exceeds a certain value, the cathode 93 of control triode 85 becomes sufficiently negative so that anode current flows and discharges capacitor 94 which is maintained at a positive potential through the resistor 95 along with the anode 96 of control triode 85. This reduced positive potential is passed through a resistor 97 to the grid 98 of triode 89 which decreases the conductivity of triode 89.

Triodes 89 and 90 are connected as a voltage doubler rectifier, the anode 99 of triode 89 being connected along with the cathode 100 of triode 90 to the source of alternating potential designated "A. C." through a capacitor 101, the other side of the source of alternating potential being grounded. The anode and grid of triode 90 are tied together so that it operates as a diode.

Operation is stabilized by a negative feed-back effect which is derived from a connection from the negatively charged capacitor 91 through resistor 102 to grid 98 of triode 89. The resistor 102 also serves to maintain the proper bias on grid 98 so that the space current of triode 89 may be effectively controlled.

The capacitance of capacitor 91 is sufficiently great so that potential changes occur relatively slowly. In this manner, it assumes a steady average potential which follows slow variations in light reaching the photomultiplier tube 60, thereby compensating for the effects of slow changes in light intensity of the light source 30, the gradual accumulation of dirt on the lenses 31 and 61, aging effects and other similar phenomena.

As the average amount of light increases, the plate current through triode 81 decreases and its cathode 83 becomes more negative. Cathode 93 of control triode 85 becomes more negative and its conductivity increases. This discharges capacitor 94 to a lower potential and grid 98 of the voltage doubler triode 89 becomes more negative, thereby decreasing the output of the voltage doubler and correspondingly decreasing the negative potential on capacitor 91. This decreases the current flow through the photomultiplier tube 60 and thereby compensates for the factor which caused the increase in average light to occur. In the event of a decrease in average light, compensation in the opposite direction takes place in a similar manner.

The output circuit of triode 81 is connected for measurement purposes from the cathode resistor 84 through a cathode follower stage comprising a triode 103 to the electrical indicator 27. The indicator 27 may be either of the indicating or recording type and will ordinarily comprise an electromagnetic movement of the d'Arsonval type appropriately damped, the other circuit constants being so dimensioned that at the signal repetition rate determined by the speed of revolving shaft 36, the indication of the indicator 27 will be determined by the peak signal magnitude rather than any average value of the signal. Any other form of peak signal measuring device may be used, if desired.

By using the modified arrangement of Figure 6, the scanning rate may be made uniform and unidirectional, thus maintaining a constant time base for the output signal independently of the position of the wire. During the quick return portion of the scanning cycle, the contacts 58 and 59 of Figure 6 are shown connected in Figure 8 to short circuit the moving coil of the indicator 27 which will cause it to hold its position by reason of the highly increased damping and will prevent response to any signal during the quick return movement of the scanning beams. Alternatively, the slit 33 may be increased or decreased in width during this portion of the scanning cycle to an extent sufficient to substantially cancel the scanning impulse which occurs during the quick return. Ordinarily, the slit 33 will be increased in width since the wire produces a shadow the effect of which can be cancelled only by increased illumination.

In operation, when the total illumination falling on photomultiplier tube 60 increases, the signal applied to the grid of cathode follower 103 of Figure 8 is in a negative going direction. The increased illumination causes a drop in space current in triode 81 decreasing the potential drop across cathode resistor 84. In the arrangement shown in Figure 8, this negative going signal across cathode resistor 84 increases the current flow through indicator 27.

Referring to Figures 9, 10 and 15 there are shown graphs representing the voltage across cathode resistor 84 plotted as ordinates against time plotted as abscissae.

In Figure 9, the first horizontal portion 104 of the curve represents the output signal across cathode resistor 84 with one of the beams unintercepted and the other portion 105 represents the signal with the other beam unintercepted. In the example of Figure 9, the first peak 106 indicates that the wire diameter is such as to intercept both beams simultaneously to such an extent that the total illumination falling on photomultiplier tube 60 is decreased with respect to the illumination of a single beam. The second peak 107 is of greater magnitude and indicates a wire of increased diameter with respect to the wire which produced the signal peak 105.

Figure 10 shows the signal obtained when the wire diameter is sufficient to intercept both beams, but where the excursion of the scanning beams exceeds the diameter of the wire, so that there are intervals when both beams remain unintercepted. The first portion of the curve 108 shows the signal with both beams unintercepted. The curve rises as the first of the two beams is intercepted and remains level until the peak 110 is produced by the simultaneous interception of both beams. Thereafter, the curve becomes level at 111 while the other beam is unintercepted and drops as indicated at 112 at the other limit of the scanning excursion when both beams are unintercepted. This situation is shown diagrammatically in Figure 10A. The succeeeding portion of the curve shows the signal produced by a wire of larger diameter and with its position shifted with respect to the diameter and position of the wire which produced the signal peak 110, the peak 113 being moved to the right and being of greater amplitude than the peak 110.

Figures 11 to 15 are graphs representing total illumination level at photomultiplier tube 60 plotted as ordinates against time plotted as abscissae.

Figure 11 shows the effect on the total illumination during a single half of a reciprocatory scanning cycle when the wire diameter is sufficient to intercept both beams simultaneously for an appreciable interval of time. In the first portion of the curve at 114, both beams are unintercepted. At 115, one of the beams is intercepted. At 116, both beams are intercepted. At 117 the other beam remains intercepted and the first beam is unintercepted. At 118, both beams are again unintercepted, in substantially the same manner as indicated in Figure 10, except that both beams remain completely intercepted for an appreciable time interval since the wire diameter is materially in excess of that shown in Figure 3 with respect to the spacing between the two beams.

Figure 12 shows the illumination when the relationship between the wire diameter and the spacing between the beams is substantially as shown in Figure 2. The dotted curve 119 represents the amount of illumination contributed individually by the beam 25 and the dotted curve 120 represents the amount of illumination contributed individually by the beam 26. Curve 121 represents the total illumination. As in Figure 11, the total illumination is first produced by both beams, then by one of the beams, then by the other and again by both beams. In Figure 12, however, the diameter of the wire is substantially equal to the center spacing between the two beams. Thus at 122, as the wire begins to intercept beam 26 and curve 120 begins to drop, the other beam 25 becomes unintercepted to the same extent and curve 119 begins to rise. This continues progressively until beam 26 is fully intercepted and beam 25 is completely unintercepted. During this transition period, the total illumination remains constant as indicated at 122. If the wire diameter is slightly less than the center spacing between the beams 25 and 26, the total illumination will increase as indicated by the peak 123 in Figure 13. If, on the other hand, the wire diameter is slightly greater than the center spacing between the beams, then the total illumination will temporarily decrease as indicated by the valley 124 in Figure 14. In this manner, a slight variation in diameter of the wire with respect to the center spacing of the two beams will produce either a peak or a valley depending upon the direction of such dimensional variation, and irrespective of the position of the wire at the time when it is scanned.

In Figure 15, a complete scanning cycle is shown where the field of scanning is greater than the wire diameter as illustratively shown in Figure 10A. The wire is assumed to be near the upper portion of its range of positions and to be slightly above its nominal diameter so that both beams are partially intercepted to such an extent that a valley 125a is produced representing a decrease in total illumination on the upward movement of beams 25 and 26 near the upper limit of movement of the beams. On the downward movement, a valley 125b of the same amplitude as valley 125a is produced near the beginning of the downward movement of the beams. The positions of the two valleys 125a and 125b are symmetrical with respect to the vertical line 126 which represents the end of the first half cycle and the beginning of the second half cycle of scanning. If the wire has moved during the interval between the upward movement and the downward movement of the two beams, then the symmetry of the valleys 125a and 125b will be disturbed, but their amplitudes will remain equal. If the wire diameter has changed but its position with respect to the scanning beams has remained fixed, then the amplitudes of the two valleys will be different but the symmetry will remain undisturbed.

If a check on the roundness or circularity of the wire is desired, two or more independent measuring systems may be used operating to measure wire diameters which are angularly displaced from each other. These independent systems are desirably closely spaced along the direction of travel of the wire to prevent errors caused by rotation of the wire in passing from one system to the next.

Figure 16 shows means for obtaining two closely spaced beams for use in the measurement of finer wires. The reciprocating mirror 38 remains as described above for Figures 5 and 6, except that it is widened. The half-silvered mirror 39 has been replaced by a pair of coplanar fixed mirrors 126a and 126b which flank the adjustable mirror 40. If adjustable mirror 40 is moved to be co-planar with the fixed mirrors 126a and 126b, the spacing between the upper and lower beams will be zero. If adjustable mirror 40 is moved upwardly by means of micrometer head 41, then the upper beam 25 will move upwardly to an extent determined by micrometer head 41 and the lower beam 26 will be divided into two laterally spaced halves 26a and 26b as may best be seen in Figure 17.

Referring to Figure 18, there is shown a modified form of device for producing a laterally moving light beam from the light beam 34 emerging from the slit 33. The mirror 38a is otherwise the same as the mirror 38 shown in Figure 5 except that the mirror 38a of Figure 18 is fixed. A revolving prism 130 is shown which has a regular polygonal transverse cross-sectional configuration. The polygon has an even number of sides so arranged that opposite sides are parallel and the polygon has been illustratively shown in Figure 18 as an octagon. The light beam 34 as it emerges from slit 32 passes between successive pairs of spaced parallel faces and through the rotational axis of prism 130. Because prism 130 is revolving at constant velocity about its longitudinal axis, the parallel faces 131 will rotate through an angle of approximately 45°. The light passing between the parallel faces will be refracted as it enters the prism and refracted again as it emerges. Since the angles of refraction are equal and opposite, the horizontal direction of the light beam will remain unchanged. It will be displaced upwardly or downwardly however, depending upon the angle of incidence at which the light beam enters the prism. This will produce the required vertical movement of the light beam 34 in passing from slit 32 to mirror 38a, and the movement will be cyclically repeated in a unidirectional manner as the next pair of opposed parallel faces 132 moves into active refracting position and the faces 131 leave their former refracting position. Faces 132 are followed in turn by the pairs of faces 133 and 134, after which faces 131 again become active.

In any of the above embodiments, precision of measurement of the apparatus can be increased by merely narrowing the light beams in the direction of scanning.

It will be further recognized that whereas I have described the invention with particular relation to the measurement of a longitudinally traveling wire, it may be employed to measure any object whether or not elongated. In fact, it may be applied to any object in which a linear dimension is to be measured and the position of which at the time of measurement is not ascertainable with precision.

What is claimed is:

1. A measuring device for gauging a linear interboundary dimension of an at least partially opaque object, which object shifts its position within predetermined limits in the direction of said dimension during said gauging, said device comprising illumination means for producing a single light beam, cyclically operative rectilinearly moving light deflecting means acting on said single beam for producing a laterally moving beam therefrom, light dividing means acting on said moving beam for producing two spaced parallel moving beams therefrom, said spaced beams being directed toward said object for interception thereby, the direction and extent of the movement of said parallel beams being at least sufficient so that each beam is successively effectively fully individually intercepted by said object in the course of each cycle of said movement, and measuring means disposed in the paths of both beams and beyond said object for measuring the instantaneous value of the total illumination of both beams after passing said object and during progressive complete individual interception of each beam, whereby said dimension may be measured irrespective of the position of said object at the time of such measurement.

2. A device according to claim 1 wherein said light dividing means comprises a partially-silvered mirror.

3. A device according to claim 1, wherein said light dividing means comprises a plurality of parallel planar reflecting surfaces against which said single beam of light impinges, said reflecting surfaces being arranged in two mutually displaceable groups, each group comprising at least one of said reflecting surfaces, all of the surfaces of each group being coplanar, said device further comprising adjustment means connected to all of the reflecting surfaces of one of said groups for varying the distance from said one group to the other of said groups in the direction of said single beam of light, whereby the distance between said two spaced beams may be varied.

4. A measuring device for gauging a linear interboundary dimension of an at least partially opaque object which shifts its position within predetermined limits in the direction of said dimension during said gauging, said device comprising illumination means for producing two parallel light beams directed toward said object, the centers of said beams being spaced apart in the direction of said dimension, cyclically operative means for producing relative movement between said beams and said object along the direction of said dimension, the amplitude of said movement being at least sufficient so that each of said beams is effectively fully intercepted by said object during the course of each cycle of said movement, photoelectric means positioned beyond said object in the paths of both of said beams to be illuminated simultaneously by both of said beams except when either beam is fully intercepted by said object, and indicating means responsive to the total illumination of both beams which reaches said photoelectric means.

5. A device according to claim 4, in which said indicating means comprises peak amplitude measuring means for giving an indication of the peak value of the total illumination of both beams which reaches said measuring means, said spaced beams being separated by a distance such that both beams are simultaneously partially intercepted during transition from full interception of one beam to full interception of the other beam.

6. A device according to claim 4 wherein said illumination means comprises means for producing a single beam of light, and dividing means acting on said single beam for producing said two spaced beams.

7. A measuring device according to claim 4, wherein said photoelectric means comprises slow-acting compensating means responsive to the average unintercepted illumination of both of said beams beyond said object for adjusting the response of said indicating means to a predetermined value.

8. A measuring device according to claim 7, wherein said compensating means includes a negative feed-back path and means included in said path for stabilizing operation of said compensating means.

9. A measuring device for gauging a linear dimension of a moving object comprising a source of illumination, means for deriving a narrow beam of illumination from said source, a continuously revolving prism disposed in the path of said beam, said prism having at least one pair of opposite parallel plane faces for refracting said beam as it passes therebetween and producing an emergent beam which is parallel to and displaced from alignment with said narrow beam by a distance which varies with the angle of incidence of said narrow beam, means for dividing said emergent beam into two parallel moving beams and for directing said parallel beams toward said object, the movement of said object having a varying and reversing component directed along the direction of movement of said parallel beams, said parallel beams moving through a distance sufficient to scan said object for successive interception thereby, and illumination responsive measuring means continuously disposed in the path of both parallel beams beyond said object.

10. A measuring device for gauging a linear interboundary dimension of an at least partially opaque object which continually varies its position by random movement in the direction of said dimension, said device comprising illumination means for producing a single light beam, cyclically operative optical means disposed in the path of said beam for producing a laterally moving beam of constant direction therefrom, light dividing means disposed in the path of said moving beam for producing two parallel moving beams therefrom, the centers of said parallel beams being fixedly spaced apart in the direction of said dimension and said spaced parallel beams being directed toward said object for interception thereby, said beams moving cyclically in the direction of said dimension with an amplitude at least sufficient so that each of said parallel beams is separately fully intercepted by said object during the course of each cycle, and light responsive measuring means disposed to receive light from both of said parallel beams throughout the range of the cyclical movement thereof, except during said full interception of either beam, whereby said dimension may be measured by said light responsive means during the course of said random movement.

11. A device according to claim 10, in which said optical means comprises a revolving prism of regular polygonal transverse cross section, said regular polygon having an even number of sides and having its center located at the rotational axis of said prism, said single beam being directed toward said rotational axis.

12. A device according to claim 10 wherein said optical means comprises a mirror by which said single beam is deflected and rectilinearly moving supporting means by which said mirror is carried.

13. A device according to claim 12, in which said reciprocating means comprises means for moving said mirror in one direction at constant velocity and in the opposite direction with a quick return movement, said device further comprising means controlled by said reciprocating means and effective during said quick return movement for suppressing response of said measuring means.

14. A measuring device for gauging a transverse dimension of an elongated and at least partially opaque object, said gauging device being disposed at a location past which said object moves longitudinally, said longitudinal movement being accompanied by a random lateral movement of said object during its passage past said location, said device comprising illumination means for producing two spaced parallel light beams of elongated transverse sectional configuration, said beams being directed toward said object with the longer transverse dimensions of said beams parallel to each other, said beams being fixedly spaced apart in the direction of said lateral movement, cyclically operative means for producing relative movement between said beams and said object in said direction of lateral movement, said relative movement being sufficient in extent to provide for complete individual interception of each of said beams by said object during each cycle of said cyclically operative means irrespective of said lateral movement of said object, and illumination measuring means disposed beyond said object and in the paths of both of said beams, said illumination measuring means being responsive to the total illumination of the unintercepted portions of both beams after passage by said object and throughout the entire range of said relative movement.

15. A measuring device according to claim 14, wherein each of said beams is of rectangular cross-sectional configuration and the centers of said beams are spaced apart by a distance which is equal to a predetermined nominal value for said transverse dimension, the minor dimension of each of said beams being substantially equal in magnitude to an anticipated range of variation in said transverse dimension whereby, when said transverse dimension of said object is equal to said nominal value, the transition from full interception of one of said beams to full interception of the other beam takes place without variation in the total intensity of illumination at said measuring means and said measuring device is operative with a maximum of sensitivity through the entirety of said anticipated range of variation.

16. A measuring device according to claim 14, wherein said means for producing said relative movement comprises cyclically operative displacement means acting on said object for superimposing on said random movement a controlled cyclical movement whereby the total movement of said object will be sufficient in extent to provide for said complete interception of each of said beams.

17. A device according to claim 14, wherein said illumination means comprises adjustment means for varying the distance between said two spaced parallel beams, said adjustment means comprising spacing indicating means including a calibrated linear dimensional scale for determining the magnitude of said distance between said beams, said spacing indicating means being connected for operation by said adjustment means.

18. A measuring device for gauging a linear dimension of a moving object, said device comprising illumination means for producing two spaced light beams of substantially equal intensities of illumination, cyclically operative means for producing relative movement between said beams and said object, said object being at least partially opaque and having a linear inter-boundary dimension which is said dimension to be gauged, the direction of said movement being along the direction of said dimension and the extent of said movement being sufficient to cause successive and effectively complete individual interceptions of each of said beams by said object, said beams being spaced apart in the direction of said dimension, and measuring means disposed in the paths of both beams and beyond said object for measuring the instantaneous value of the total illumination produced by both of said beams after passing said object and during said interceptions, whereby said dimension may be measured irrespective of the position of said object along said direction of said dimension and within the range of said movement during said measurement.

19. A device according to claim 18 wherein said illumination means comprises means for producing a single beam of light, and dividing means acting on said single beam for producing said two spaced beams, said dividing means causing said beams to be parallel to each other.

References Cited in the file of this patent

UNITED STATES PATENTS

| | | |
|---|---|---|
| 2,237,811 | Cockrell | Apr. 8, 1941 |
| 2,290,606 | Burnett | July 21, 1942 |
| 2,455,532 | Sustein | Dec. 7, 1948 |
| 2,474,906 | Meloon | July 5, 1949 |
| 2,514,985 | Banner | July 11, 1950 |
| 2,532,964 | Taylor et al. | Dec. 5, 1950 |
| 2,565,265 | Peterson | Aug. 21, 1951 |
| 2,614,226 | Davis | Oct. 14, 1952 |
| 2,648,250 | Zobel | Aug. 11, 1953 |
| 2,670,650 | Wilmote | Mar. 2, 1954 |
| 2,670,651 | Burns et al. | Mar. 2, 1954 |

FOREIGN PATENTS

| | | |
|---|---|---|
| 615,226 | Great Britain | Jan. 4, 1949 |
| 854,587 | Germany | Nov. 6, 1952 |